United States Patent
Shumway et al.

(10) Patent No.: US 10,479,924 B2
(45) Date of Patent: *Nov. 19, 2019

(54) PACKING FLUIDS AND METHODS

(71) Applicant: HALLIBURTON ENERGY SERVICES, INC., Houston, TX (US)

(72) Inventors: William Walter Shumway, Spring, TX (US); Cato Russell McDaniel, Montgomery, TX (US); Dale E. Jamison, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/783,798

(22) PCT Filed: May 15, 2014

(86) PCT No.: PCT/US2014/038190
§ 371 (c)(1),
(2) Date: Oct. 9, 2015

(87) PCT Pub. No.: WO2015/174987
PCT Pub. Date: Nov. 19, 2015

(65) Prior Publication Data
US 2016/0145484 A1 May 26, 2016

(51) Int. Cl.
*C09K 8/512* (2006.01)
*C09K 8/508* (2006.01)
*C09K 8/03* (2006.01)
*C09K 8/504* (2006.01)

(52) U.S. Cl.
CPC .............. *C09K 8/5083* (2013.01); *C09K 8/03* (2013.01); *C09K 8/5045* (2013.01); *C09K 8/512* (2013.01); *C09K 2208/22* (2013.01); *C09K 2208/26* (2013.01); *C09K 2208/32* (2013.01)

(58) Field of Classification Search
CPC ...... C09K 8/5045; C09K 11/06; C09K 11/64; C09K 11/646; C09K 11/666; C09K 2208/00; C09K 2208/18; C09K 2208/22; C09K 2208/26; C09K 2208/032; C09K 8/032; C09K 8/06; C09K 8/08; C09K 8/12; C09K 8/36; C09K 8/42; C09K 8/502; C09K 8/5083; C09K 8/512; C09K 8/516; C09K 8/58; C09K 8/62; C09K 2208/32; E21B 33/134; E21B 33/138; E21B 43/16
See application file for complete search history.

(56) References Cited

U.S. PATENT DOCUMENTS

| | | | | |
|---|---|---|---|---|
| 4,120,369 A | * | 10/1978 | Fischer | E21B 21/003 166/292 |
| 4,534,412 A | | 8/1985 | Dovan et al. | |
| 4,623,021 A | * | 11/1986 | Stowe | E21B 43/04 166/250.1 |
| 4,816,303 A | * | 3/1989 | Kroenke | C09K 8/54 106/14.15 |
| 7,273,832 B2 | | 9/2007 | Benton et al. | |
| 2008/0135302 A1 | * | 6/2008 | Zhang | C09K 8/36 175/70 |
| 2008/0223596 A1 | | 9/2008 | Ezell et al. | |
| 2008/0224087 A1 | | 9/2008 | Ezell et al. | |
| 2008/0227665 A1 | | 9/2008 | Ezell et al. | |
| 2010/0210486 A1 | * | 8/2010 | Horton | C09K 8/512 507/224 |
| 2010/0305010 A1 | * | 12/2010 | Falana | C09K 8/06 507/274 |
| 2011/0247986 A1 | * | 10/2011 | Zhang | C02F 1/722 210/721 |

FOREIGN PATENT DOCUMENTS

EP   2508584 A1   10/2012

OTHER PUBLICATIONS

Ind.Eng.Chem.Prod.Res. Developl,vol. 9, No. 2 1970; Continuous Production of Glycerol by Catalytic high Pressure Hydrogenolysis of Sucrose, pp. 210-212.
International Search Report and Written Opinion dated Feb. 24, 2015; in International application No. PCT/US2014/038190.
Final Office Action; U.S. Appl. No. 14/771,907; dated May 25, 2018.

* cited by examiner

*Primary Examiner* — Kumar R Bhushan
(74) *Attorney, Agent, or Firm* — Polsinelli PC

(57) ABSTRACT

Packing fluids that include (a) an aqueous solvent, and optionally one or more water-miscible organic liquids; and (b) one or more organic cationic and/or alkali metal tungstates, molybdates, and/or silicates dissolved in the solvent are disclosed. The fluid may be substantially free of salts and esters of formic acid. The disclosure further relates to methods of making and using the packing fluids.

8 Claims, 1 Drawing Sheet

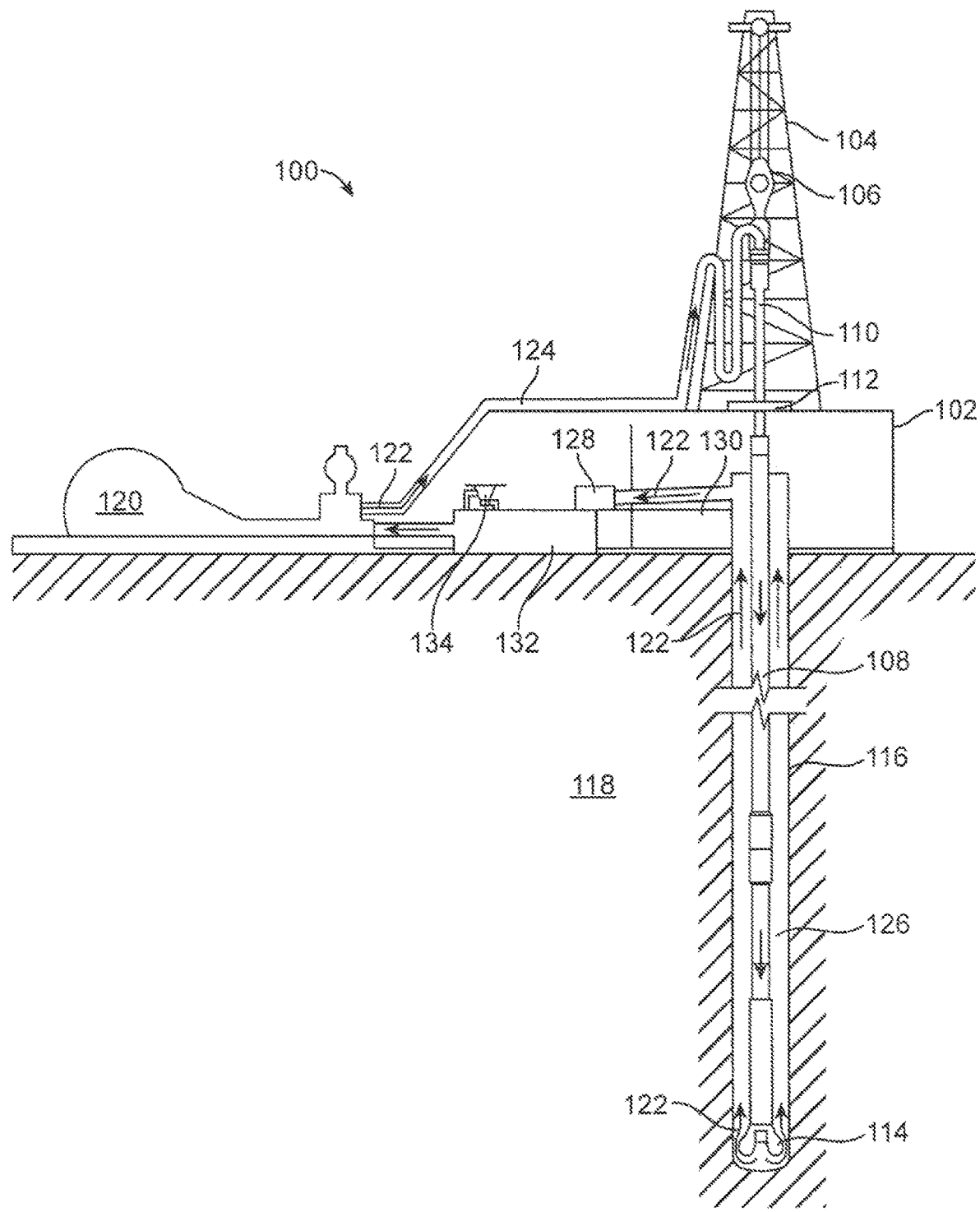

PACKING FLUIDS AND METHODS

CROSS-REFERENCE TO RELATED APPLICATIONS

This application is a national stage entry of PCT/US2014/038190 filed May 15, 2014, said application is expressly incorporated herein in its entirety.

FIELD

The present disclosure relates to packing fluids for hydrostatic pressure control and packing fluids that have good insulating properties, are stable at high temperatures, and have low thermal conductivity. The packing fluids are useful in applications requiring an insulating fluid such as in pipeline and subterranean applications (e.g., to insulate petroleum production conduits).

BACKGROUND

Packing fluids are often used in subterranean operations. These fluids are placed into an annulus between a first tubing and a second tubing or the walls of a well bore. The packing fluid acts to insulate a first fluid (e.g., a hydrocarbon fluid) that may be located within the first tubing from the environment surrounding the first tubing or the second tubing to enable optimum recovery of the hydrocarbon fluid. For instance, if the surrounding environment is very cold, the packing fluid protects the first fluid in the first tubing from the environment so that it can efficiently flow through the production tubing, e.g., the first tubing, to other facilities. This is desirable because heat transfer can cause problems such as the precipitation of heavier hydrocarbons, severe reductions in flow rate, and in some cases, casing collapse. Additionally, when used in packer applications, a required amount of hydrostatic head pressure is needed. Thus, higher density packing fluids are often used provide the requisite hydrostatic force. Packing fluids are also used for similar applications involving pipelines for similar purposes, e.g., to protect a fluid located within the pipeline from the surrounding environmental conditions so that the fluid can efficiently flow through the pipeline. Packing fluids can be used in other applications as well, wherein it is desirable to control heat transfer. These applications may or may not involve hydrocarbons.

Cesium formate is often used in packing fluids because it is extremely soluble in water. Nonetheless, cesium formate is expensive, can cause corrosion problems such as hydrogen stress corrosion cracking and hydrogen embrittlement, and is not always sufficient to weight up the fluid. Localized corrosion, pitting and stress corrosion cracking are particularly problematic and related to a high risk of unpredictable and rapid failure of metal integrity. Pitting corrosion and stress corrosion cracking are common and frequently occur in well tubulars constructed from so-called corrosion resistant alloys. Corrosion inhibitors have little or no effect and can actually initiate corrosion. Hydrogen embrittlement is a brittle mechanical fracture of high-strength steels caused when atomic hydrogen dissolves in the crystal structure of a metal rather than forming hydrogen gas. It typically occurs in corrosive environments under constant tensile stress, similar to hydrogen stress corrosion cracking. The most common form is sulphide stress cracking, which occurs when stressed metal is exposed to water containing hydrogen sulphide or other sulphur compounds, generally under aerobic conditions.

BRIEF DESCRIPTION OF THE DRAWINGS

These drawings illustrate certain aspects of some of the embodiments of the present method, and should not be used to limit or define the disclosed fluids or methods of using the disclosed fluids.

FIG. 1 illustrates a system for drilling a wellbore in accordance with certain embodiments.

DETAILED DESCRIPTION

The instant disclosure relates to packing fluids that have a low inherent thermal conductivity and prevent convection currents that could carry heat away. Furthermore, the packing fluids tolerate high temperatures (e.g., temperatures of 240° F. and above) for long periods of time, are easy to handle, and are compatible with many types of brines. One advantage of the packing fluids of the instant disclosure is that although they may contain formate salts, they do not require the use of formate salts; fluids substantially free of formate salts thus do not form hydrogen on thermal degradation, and therefore avoid the problems of hydrogen stress corrosion cracking. Furthermore, the amine salts serve a dual function as weighting agents and corrosion inhibitors or shale stabilizers. In various embodiments packing fluid comprises: (a) an aqueous solvent, and optionally one or more water-miscible organic liquids; and (b) one or more organic cationic and/or alkali metal tungstates, molybdates, and/or silicates dissolved in the solvent. In some embodiments, the packing fluid is substantially free of salts and esters of formic acid.

In one embodiment, the packing fluid comprises: (a) an aqueous solvent, and optionally one or more water-miscible organic liquids; (b) one or more organic cationic and/or alkali metal tungstates, molybdates, and/or silicates dissolved in the solvent; and (c) a polymer. In some embodiments, the packing fluid is substantially free of salts and esters of formic acid.

The one or more organic cations may be, for example, cationic amines, cationic polyamines, ammonium compounds, phosphonium compounds, and/or amine oxides. In some instances, the one or more organic cations are cationic amines, cationic polyamines, and/or ammonium compounds, in particular, aliphatic amines, hydroxyl amines, polyamines, guanidine and/or guanidine derivatives. In other instances, the one or more organic cations are ethanolamine, diethanolamine, triethanolamine, ethylenediamine, diethylenetriamine, triethylenetetramine, guanidine and guanidine derivatives, and hydroxylamine and hydroxylamine derivatives.

In addition to the advantages of organic cationic salts of tungstates, molybdates, and silicates as weighting agents, in various embodiments the organic cations may have the added benefit of acting as corrosion inhibitors and shale stabilizers, including in particular embodiments cationic amines and phosphonates. The inhibition of corrosion is of relevant advantage in high-salt environments. In various embodiments, organic cations may also provide the advantage of monitoring of their concentrations by titration or colorimetric detection techniques.

The one or more alkali metal tungstates, molybdates, and/or silicates lithium, sodium, potassium, rubidium, and cesium tungstates, molybdates, and/or silicates. The alkali metal tungstate, molybdates, and/or silicates can be present in any concentration and the alkali metal tungstate, molybdate, and/or silicate is often a liquid at room temperature. Therefore, the concentration of the alkali metal tungstate, molybdate, and/or silicate in the packing fluids of the present disclosure, such as a completion fluid or insulative fluid, can be from about 1% to about 100% by weight, and in an amount of from about 40% to about 95% by weight, and present in the fluid at a range of from about 55% to about 85% by weight, or present in the fluid at a range of from about 70% to about 85% by weight, based on the weight of the fluid.

The one or more organic cationic and/or alkali metal tungstates, molybdates, and/or silicates in various embodiments may be present in an amount such that the density of the packing fluid may be from about 7 to about 22 lbs/gal, from about 10 to about 20 lbs/gal, or from about 15 about 19.2 lbs/gal. The pH of the packing fluid may be from about 7 to about 13, or from about 8 to about 11. Buffers may be used to help maintain and/or achieve an appropriate pH. For example, one or more of the following buffers may be included in the packing fluid: a citrate salt, borax, triethanolamine, triethylene pentamine, diethylenetriamine, an acetate salt, a propionate salt, a succinate salt, an adipate salt, $H_3BO_3$, ethanolamine, N-Tris(hydroxymethyl)methyl-3-aminopropanesulfonic acid (TAPS), bicine, and N-cyclohexyl-2-aminoethanesulfonic acid (CHES), trisodium phosphate, sodium bicarbonate, sodium carbonate, potassium carbonate, tripotassium phosphate, and/or potassium bicarbonate.

The water-miscible organic liquids that may be included in the packing fluids of the present disclosure include water-miscible materials having relatively low thermal conductivity, including but not limited to materials being about half as conductive as water or less). By "water-miscible," it is meant that about 5 grams or more of the organic liquid will disperse in 100 grams of water. Suitable water-miscible organic liquids include, but are not limited to, esters, amines, alcohols, polyols, glycol ethers, or combinations and derivatives of these. Examples of suitable esters include, but are not limited to, low molecular weight esters; specific examples include, but are not limited to, methylformate, methyl acetate, and ethyl acetate. Examples of suitable amines include, but are not limited to, low molecular weight amines; specific examples include, but are not limited to, diethyl amine, 2-aminoethanol, and 2-(dimethylamino)ethanol. Examples of suitable alcohols include, but are not limited to, methanol, ethanol, propanol, isopropanol, and the like. Examples of glycol ethers include, but are not limited to, ethylene glycol butyl ether, diethylene glycol methyl ether, dipropylene glycol methyl ether, tripropylene glycol methyl ether, and the like. Of these, polyols are useful since they generally exhibit good thermal and chemical stability, high flash point values, and are benign with respect to elastomeric materials.

Suitable polyols include aliphatic alcohols containing two or more hydroxy groups. In some embodiments, the polyol is at least partially water-miscible. Examples of suitable polyols include, but are not limited to, water-soluble diols such as ethylene glycols, propylene glycols, polyethylene glycols, polypropylene glycols, diethylene glycols, triethylene glycols, dipropylene glycols and tripropylene glycols, combinations of these glycols, their derivatives, and reaction products formed by reacting ethylene and propylene oxide or polyethylene glycols and polypropylene glycols with active hydrogen base compounds (e.g., polyalcohols, polycarboxylic acids, polyamines, or polyphenols).

The polyglycols of ethylene generally are water-miscible at molecular weights at least as high as 20,000. The polyglycols of propylene, although giving slightly better grinding efficiency than the ethylene glycols, are water-miscible up to molecular weights of only about 1,000.

Other glycols include, but are not limited to, neopentyl glycol, pentanediols, butanediols, and such unsaturated diols as butyne diols and butene diols. In addition to the diols, the triol, glycerol, and such derivatives as ethylene or propylene oxide adducts may be used. Other higher polyols may include pentaerythritol. Another class of polyhydroxy alcohols is the sugar alcohols. The sugar alcohols are obtained by reduction of carbohydrates and differ greatly from the above-mentioned polyols. Combinations and derivatives of these are suitable as well.

The choice of polyol to be used is largely dependent on the desired density of the fluid. For higher density fluids, a higher density polyol may be used, for instance, triethylene glycol or glycerol are useful in some embodiments. For lower density applications, ethylene or propylene glycol may be used. In some embodiments, more salt may be needed to adequately weight the fluid to the desired density. In certain embodiments, the amount of polyol that should be used may be governed by the thermal conductivity ceiling of the fluid and the desired density of the fluid. If the thermal conductivity ceiling is 0.17 BTU/hft° F., then the concentration of the polyol may be from 40% to 99%. The range may also be from 70% to 99%.

Examples of polymers that may be suitable for use in the packing fluid of the instant disclosure include, but are not limited to, acrylic acid polymers, acrylic acid ester polymers, acrylic acid derivative polymers, acrylic acid homopolymers, acrylic acid ester homopolymers (such as poly (methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), polyacrylamide homopolymer, n-vinyl pyrolidone and polyacrylamide copolymers, poly(butyl methacrylate), and poly(2-ethylhexyl methacrylate)), n-vinyl pyrolidone, acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate copolymers, and combinations thereof. Copolymers and terpolymers may be suitable as well. Mixtures of any of these polymers may be suitable as well. In some embodiments, the polymer should be at least partially water soluble. The polymers can be cationic, anionic, nonionic, or zwitterionic. In certain embodiments, the polymer comprises from about 0.1% to about 15% weight of the fluid, from 0.5% to 8%, or from about 0.5% to about 4%, based on the total weight of the fluid.

To obtain a desired gel characteristic and thermal stability, the polymer included in the fluid may be cross-linked by an appropriate crosslinking agent. In those embodiments where it is desirable to crosslink the polymer, optionally, one or more crosslinking agents may be added to the fluid to crosslink the polymer. One type of suitable crosslinking agent is a combination of a phenolic component (or a phenolic precursor) and formaldehyde (or formaldehyde precursor). Suitable phenolic components or phenolic precursors include, but are not limited to, phenols, hydroquinone, salicylic acid, salicylamide, aspirin, methyl-p-hydroxybenzoate, phenyl acetate, phenyl salicylate, o-aminobenzoic acid, p-aminobenzoic acid, m-aminophenol, furfuryl alcohol, and benzoic acid. Suitable formaldehyde precursors may include, but are not limited to, hexamethylenetetramine, glyoxal, and 1,3,5-trioxane. This crosslinking agent system often needs approximately 250° F.

to thermally activate to crosslink the polymer. Another type of suitable crosslinking agent is polyalkylimine. This crosslinking agent usually needs approximately 90° F. to activate to crosslink the polymer. This crosslinking agent may be used alone or in conjunction with any of the other crosslinking agents discussed herein.

Another type of crosslinking agent that may be used includes non-toxic organic crosslinking agents that are free from metal ions. Examples of such organic cross-linking agents are polyalkyleneimines (e.g., polyethyleneimine), polyalkylenepolyamines and mixtures thereof. In addition, water-soluble polyfunctional aliphatic amines, arylalkylamines and heteroarylalkylamines may be utilized.

When included, suitable crosslinking agents may be present in the fluids of the present disclosure in an amount sufficient to provide, inter alia, the desired degree of crosslinking. In certain embodiments, the crosslinking agent or agents may be present in an amount in the range of from about 0.0005% to about 10% weight by volume of the fluid. In certain embodiments, the crosslinking agent may be present in the range of from about 0.001% to about 5% weight by volume of the fluid. One of ordinary skill in the art, with the benefit of this disclosure, will recognize the appropriate amount of crosslinking agent to include based on, among other things, the temperature conditions of a particular application, the type of polymer(s) used, the molecular weight of the polymer(s), the desired degree of viscosification, and/or the pH of the fluid.

The packing fluids of the instant disclosure may also include one or more hydrogen sulfide scavengers. Examples of hydrogen sulfide scavengers include, but are not limited to, an amine, a polyamine, an aldehyde, ferrous gluconate, iron oxide, copper carbonate, hydrogen peroxide, zinc oxide, zinc carbonate, and zinc carbonate.

In some embodiments, the packing fluids of the instant disclosure include one or more solid weighting agents. Examples of solid weighting agents include, but are not limited to, barite, hematite, calcium carbonate, magnesium carbonate, iron carbonate, zinc carbonate, manganese tetraoxide, and ilmenite.

In certain embodiments, the packing fluid further includes a glycol; or may include one or more additives such as corrosion inhibitors, pH modifiers, biocides, glass beads, hollow spheres, hollow microspheres, rheology modifiers, buffers, hydrate inhibitors, breakers, tracers, additional weighting agents, viscosifiers, and surfactants.

The present disclosure further relates to methods of forming a packing fluid. In one embodiment, the method comprises:
(a) providing a solvent, wherein the solvent comprises water, and optionally one or more water-miscible organic liquids;
(b) dissolving one or more organic cationic and/or alkali metal tungstates, molybdates, and/or silicates;
(c) adding one or more polymers to the solvent and allowing the polymer(s) to hydrate;
(d) optionally adding a crosslinking agent to crosslink the polymer;
(e) placing the mixture of components (a), (b), (c), and (d) in a chosen location; and
(f) allowing the mixture to activate and form a gel.

In some embodiments, the method further comprises adding one or more salts or esters of formic acid to the solvent.

The method may further involve removing the gel from the chosen location by diluting the crosslinks in the polymer, diluting the structure of the polymer, or by physical displacement. In some embodiments, the packing fluid is formed at a well-site location, at a pipeline location, on-the-fly at a well site, or off-site and transported to a chosen site for use. Additionally, the methods may include adding one or more additives to the mixture, wherein the one or more additives may include a corrosion inhibitor, a pH modifier, a biocide, glass beads, hollow spheres, hollow microspheres, a rheology modifier, a buffer, a hydrate inhibitor, a breaker, a tracer, an additional weighting agent, a viscosifier, and/or a surfactant.

In one embodiment, the present disclosure relates to a method comprising: providing an annulus between a first tubing and a second tubing; providing a packing fluid as described herein, and placing the packing fluid in the annulus. In another embodiment, the present disclosure relates to a method comprising: providing a tubing containing a first fluid located within a well bore such that an annulus is formed between the tubing and a surface of the well bore; providing a packing fluid as described herein; and placing the packing fluid in the annulus. In yet another embodiment, the present disclosure relates to a method comprising: providing a first tubing that comprises at least a portion of a pipeline that contains a first fluid; providing a second tubing that substantially surrounds the first tubing thus creating an annulus between the first tubing and the second tubing; providing a packing fluid as described herein; and placing the packing fluid in the annulus.

In another embodiment, the method entails mixing the fluid using mixing equipment and placing the fluid in the subterranean zone, for example, by using pumping equipment.

The exemplary fluids disclosed herein may directly or indirectly affect one or more components or pieces of equipment associated with the preparation, delivery, recapture, recycling, reuse, and/or disposal of the disclosed fluids. For example, and with reference to FIG. 1, the disclosed fluids may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned"

drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed fluids may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed fluids may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed fluids may be stored, reconditioned, and/or regulated until added to the drilling fluid 122.

As mentioned above, the disclosed fluids may directly or indirectly affect the components and equipment of the drilling assembly 100. For example, the disclosed fluids may directly or indirectly affect the fluid processing unit(s) 128 which may include, but are not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary fluids.

The disclosed fluids may directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids may also directly or indirectly affect the mixing hopper 134 and the retention pit 132 and their assorted variations.

The disclosed fluids may also directly or indirectly affect the various downhole equipment and tools that may come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids may also directly or indirectly affect any downhole heat exchangers, valves and corresponding actuation devices, tool seals, packers and other wellbore isolation devices or components, and the like associated with the wellbore 116. The disclosed fluids may also directly or indirectly affect the drill bit 114, which may include, but is not limited to, roller cone bits, PDC bits, natural diamond bits, any hole openers, reamers, coring bits and the like.

While not specifically illustrated herein, the disclosed fluids may also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

The terms "comprising," "having," and "including" are used in their open, non-limiting sense.

The terms "a," "an," and "the" are understood to encompass the plural as well as the singular.

The expression "at least one" means one or more and thus includes an individual component as well as mixtures/combinations.

All elements positively set forth herein may be negatively excluded.

To facilitate a better understanding of the present disclosure, the following examples of certain embodiments are given. In no way should the following examples be read to limit, or define, the scope of the disclosure.

EXAMPLE 1

Insulating Packing Fluid

An insulating packing fluid can be prepared by combining the components in the table below. The ammonium tungstate brine is prepared by adding sufficient ammonium tungstate to water to attain a specific gravity of 2.2. The calculated density of the insulating packing fluid is 1.74 SG (14.5 lb/gal).

| Ingredient | Purpose/Description | Amount |
| --- | --- | --- |
| Ammonium tungstate brine (2.2 SG) | Brine made from ammonium tungstate and water | 0.555 bbl/bbl |
| N-SOLATE ® 275 VIS | Viscosifier | 0.180 bbl/bbl |
| N-SOLATE ® 275 XLINK | Thermally Activated Crosslinker | 0.040 bbl/bbl |
| N-SOLATE ® BASE A | Glycol | 0.225 bbl/bbl |
| Calculated Density | | 1.74 SG (14.5 lb/gal) |

* bbl/bbl refers to barrel/barrel (used for adding liquids)
* lb/bbl refers to pounds per barrel (used for adding solids)
* SG refers to Specific Gravity

EXAMPLE 2

Non-Insulating Packing Fluids

Non-insulating packing fluids can be prepared by combining the components in the table below. The ammonium tungstate brine is prepared by adding sufficient ammonium tungstate to water to attain a specific gravity of from 1.01 to 2.35, to achieve the desired density. OXYGON®, an oxygen scavenger, is added to the brine followed by the addition of the potassium bicarbonate and potassium carbonate. The pH of the product may be adjusted up to 11, if desired.

| Ingredient | Purpose/Description | Amount |
| --- | --- | --- |
| Ammonium tungstate brine (1.01-2.35 SG) | Brine made from ammonium tungstate and water | 0.99 bbl/bbl |
| Potassium Carbonate | (weighting/bridging agent) | 3 lbs/bbl |

-continued

| Ingredient | Purpose/Description | Amount |
| --- | --- | --- |
| Potassium Bicarbonate | (weighting/bridging agent) | 5 lbs/bbl |
| OXYGON ® | Oxygen Scavenger | 0.5 lbs/bbl |

* bbl/bbl refers to barrel/barrel (used for adding liquids)
* lb/bbl refers to pounds per barrel (used for adding solids)
* SG refers to Specific Gravity The foregoing descriptions of specific compositions and methods of the present disclosure have been presented for purposes of illustration and description. They are not intended to be exhaustive or to limit the disclosure to the precise compositions and methods disclosed and obviously many modifications and variations are possible in light of the above teaching. The embodiments were chosen and described in order to best explain the principles of the disclosure and its practical application, to thereby enable others skilled in the art to best utilize the disclosure with various modifications as are suited to the particular use contemplated. It is intended that the scope of the disclosure be defined by the claims appended hereto and their equivalents.

What is claimed is:

1. A packing fluid comprising:
   (a) an aqueous solvent;
   (b) ammonium tungstate dissolved in the solvent; and
   (c) one or more solid weighting agents,
   the ammonium tungstate is in an amount such that the density of the packing fluid is from about 15 lbs/gal to about 22 lbs/gal.

2. The packing fluid of claim 1, wherein the fluid is substantially free of salts and esters of formic acid.

3. The packing fluid according to claim 1, further comprising one or more water-miscible organic liquids selected from the group consisting of esters, amines, alcohols, polyols, and glycol ethers.

4. The packing fluid according to claim 1 having a pH of from about 7 to about 13.

5. The packing fluid of claim 1, further comprising a polymer.

6. The packing fluid according to claim 5 wherein the polymer is crosslinked.

7. The packing fluid according to claim 5, wherein the polymer is selected from the group consisting of an acrylic acid polymer, an acrylic acid ester polymer; an acrylic acid derivative polymer, an acrylic acid homopolymer, an acrylic acid ester homopolymer, a poly(methyl acrylate), a poly (butyl acrylate), a poly(2-ethylhexyl acrylate), an acrylic acid ester co-polymer, a methacrylic acid derivative polymer, a methacrylic acid homopolymer, a methacrylic acid ester homopolymer, a poly(methyl methacrylate), a polyacrylamide homopolymer, an n-vinyl pyrolidone and polyacrylamide copolymer, a poly(butyl methacrylate), a poly (2-ethylhexyl methacryate)), an n-vinyl pyrolidone, an acrylamido-methyl-propane sulfonate polymer, an acrylamido-methyl-propane sulfonate derivative polymer, an acrylamido-methyl-propane sulfonate co-polymer, and an acrylic acid/acrylamido-methyl-propane sulfonate copolymer.

8. The packing fluid according to claim 5 wherein the polymer has been crosslinked in a reaction comprising one or more crosslinking agents selected from the group consisting of a combination of a phenolic components or a phenolic precursor and formaldehyde or a formaldehyde precursor, a polyalkylimine, a non-toxic organic crosslinking agent that is free from metal ions, a polyalkyleneimine, a polyethyleneimine, a polyalkylenepolyamine, a water-soluble polyfunctional aliphatic amine, an arylalkylamine, and a heteroarylalkylamine.

* * * * *